United States Patent
Nielsen et al.

(10) Patent No.: US 11,321,252 B2
(45) Date of Patent: *May 3, 2022

(54) SELECTING A PRIORITY QUEUE FROM WHICH TO PROCESS AN INPUT/OUTPUT (I/O) REQUEST USING A MACHINE LEARNING MODULE

(71) Applicant: INTERNATIONAL BUSINESS MACHINES CORPORATION, Armonk, NY (US)

(72) Inventors: Karl A. Nielsen, Tucson, AZ (US); Clint A. Hardy, Tucson, AZ (US); Lokesh M. Gupta, Tucson, AZ (US); Matthew G. Borlick, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,201

(22) Filed: May 18, 2018

(65) Prior Publication Data

US 2019/0354496 A1 Nov. 21, 2019

(51) Int. Cl.
*G06F 13/22* (2006.01)
*G06N 20/00* (2019.01)
(Continued)

(52) U.S. Cl.
CPC .......... *G06F 13/225* (2013.01); *G06F 3/0611* (2013.01); *G06F 3/0656* (2013.01);
(Continued)

(58) Field of Classification Search
CPC .............................. G06F 13/225; G06N 20/00
(Continued)

(56) References Cited

U.S. PATENT DOCUMENTS

| | | |
|---|---|---|
| 5,444,820 A | 8/1995 | Tzes et al. |
| 5,504,894 A | 4/1996 | Ferguson et al. |

(Continued)

FOREIGN PATENT DOCUMENTS

JP 2012005087 A 1/2012

OTHER PUBLICATIONS

Bex, P., "Implementing a Process Scheduler Using Neural Network Technology", Master's Thesis, Radboud University Nijmegen, May 19, 2008, pp. 65.

(Continued)

*Primary Examiner* — Idriss N Alrobaye
*Assistant Examiner* — Brooke J Taylor
(74) *Attorney, Agent, or Firm* — Konrad Raynes Davda & Victor LLP; David W. Victor (57) ABSTRACT

Provided are a computer program product, system, and method for using at least one machine learning module to select a priority queue from which to process an Input/Output (I/O) request. Input I/O statistics are provided on processing of I/O requests at the queues to at least one machine learning module. Output is received from the at least one machine learning module for each of the queues. The output for each queue indicates a likelihood that selection of an I/O request from the queue will maintain desired response time ratios between the queues. The received output for each of the queues is used to select a queue of the queues. An I/O request from the selected queue is processed.

18 Claims, 6 Drawing Sheets

(51) Int. Cl.
*G06F 3/06* (2006.01)
*G06F 5/06* (2006.01)
*G06F 13/16* (2006.01)
*G06N 99/00* (2019.01)

(52) U.S. Cl.
CPC .............. *G06F 3/0689* (2013.01); *G06F 5/06* (2013.01); *G06F 13/1673* (2013.01); *G06N 20/00* (2019.01)

(58) Field of Classification Search
USPC ........................................................ 710/220
See application file for complete search history.

(56) References Cited

U.S. PATENT DOCUMENTS

| | | | |
|---|---|---|---|
| 5,788,420 | A | 8/1998 | Scales |
| 7,278,141 | B2 | 10/2007 | Accapadi et al. |
| 7,298,698 | B1 | 11/2007 | Callum |
| 7,721,061 | B1 | 5/2010 | Kelly et al. |
| 7,990,978 | B1 | 8/2011 | Chamas et al. |
| 8,799,535 | B2 | 8/2014 | Hluchyj et al. |
| 8,879,561 | B2 | 11/2014 | Chamas et al. |
| 10,217,061 | B2 | 2/2019 | Hayes et al. |
| 10,558,596 | B2 | 2/2020 | Nielsen et al. |
| 2005/0050246 | A1 | 3/2005 | Lakkakorpi et al. |
| 2009/0182790 | A1 | 7/2009 | Hluchyj et al. |
| 2011/0249554 | A1 | 10/2011 | Chamas et al. |
| 2012/0198150 | A1* | 8/2012 | Benhase .............. G06F 3/0617 711/114 |
| 2012/0331083 | A1 | 12/2012 | Li et al. |
| 2013/0111031 | A1 | 5/2013 | Hoffmann |
| 2015/0326485 | A1 | 11/2015 | Novak et al. |
| 2016/0028635 | A1 | 1/2016 | Wang |
| 2017/0090975 | A1* | 3/2017 | Baracaldo Angel .. G06F 9/4843 |
| 2017/0123730 | A1 | 5/2017 | Losh |
| 2018/0341875 | A1 | 11/2018 | Carr |
| 2019/0114109 | A1 | 4/2019 | Arora et al. |
| 2019/0354497 | A1 | 11/2019 | Nielsen et al. |
| 2020/0142846 | A1 | 5/2020 | Nielsen et al. |

OTHER PUBLICATIONS

IBM, "A Fair and Adaptive Method of Servicing Priority Queues", IP.com, IP.com No. IPCOM000183034D, May 12, 2009, pp. 3.

Siemens et al., "Database Performance Optimizing for High Prioritized Data and Request", IP.com, IP.com No. IPCOM000171498D, Jun. 25, 2008, pp. 4.

J. Bjornstad, et al., "Reliability of Service Leval Estimators in the Data Centre", IEEE, 2007, pp. 4.

N Chen, et al., "Violation Probability in Processor-Sharing Queues", IEEE, 2008, pp. 6.

Office Action dated Jun. 20, 2019, pp. .24, for U.S. Appl. No. 16/052,518, pp. 11, dated Aug. 1, 2018 (18.794C1).

Amendment dated Sep. 20, 2019, pp. 10, to Office Action dated Jun. 20, 2019, pp. 24, for U.S. Appl. No. 16/052,518, pp. 11 (18.794C1).

Notice of Allowance dated Oct. 2, 2019, pp. 20, for U.S. Appl. No. 16/052,518, pp. 11 (18.794C1).

U.S. Appl. No. 16/735,644, filed Jan. 6, 2020 (18.794C2).

Preliminary Amendment filed on Jan. 6, 2020, pp. 8, for U.S. Appl. No. 16/735,644 (18.794C2).

List of IBM Patents and Applications Treated as Related, Feb. 7, 2020, pp. 2.

Response dated Sep. 30, 2020, pp. 12, to Office Action dated Jun. 30, 2020, pp. 31, for U.S. Appl. No. 16/735,644 (18.794C2).

Notice of Allowance dated Nov. 4, 2020, pp. 12, for U.S. Appl. No. 16/735,644 (18.794C2).

Office Action dated Jun. 30, 2020, pp. 31, for U.S. Appl. No. 16/735,644 (18.794C2).

List of IBM Patents or Patent Applications Treated as Related, dated Aug. 2, 2018, 2 pp.

Preliminary Amendment for U.S. Appl. No. 16/052,518, pp. 11, dated Aug. 1, 2018 (18.794C1).

U.S. Appl. No. 16/052,518, filed Aug. 1, 2018, entitled "Using a Machine-Learning Module To Select a Priority Queue From Which To Process an Input/Output (I/O) Request", invented by K.A. Nielsen et al., Total 40 pp. [18.794C1 (Appln)].

* cited by examiner

Queue Information

FIG. 3

Rank Information

FIG. 4

Task Control Block

SELECTING A PRIORITY QUEUE FROM WHICH TO PROCESS AN INPUT/OUTPUT (I/O) REQUEST USING A MACHINE LEARNING MODULE

BACKGROUND OF THE INVENTION

1. Field of the Invention

The present invention relates to a computer program product, system, and method for using a machine learning module to select a priority queue from which to process an Input/Output (I/O) request.

2. Description of the Related Art

A storage controller may manage access to a storage configured as a Redundant Array of Independent Disks (RAID) array configured to have a plurality of RAID ranks. A storage controller may include one or more device adaptors that manage the processing of I/O requests to connected storage devices. Each of the device adaptors may maintain priority queues to queue I/O requests of different priorities for a RAID rank. The device adaptor may then use a round robin or other selection algorithm to select one of the queues to process, and process more requests from the higher priority queue than a lower priority queue when round robin selecting one of the queues. In this way, the device adaptor favors selection of the higher priority queues by processing more requests from a higher priority queue than a lower priority queue. For instance, when round robin selecting one of a low, medium and high priority queues, the device adaptor may select the most requests to process, e.g., 30 requests, from the high priority queue, then select a second highest number of requests, e.g., 10, from the medium priority queue, and then select the lowest number of requests from the low priority queue, e.g., 2.

There is a need in the art for improved techniques to select a priority queue from a plurality of priority queues from which to select an I/O request to process.

SUMMARY

A first embodiment provides a computer program product, system, and method for using a machine learning module to select a priority queue from which to process an Input/Output (I/O) request to a storage. Input I/O statistics are provided on processing of I/O requests at the queues to a machine learning module. Output is received from at least one machine learning module for each of the queues. The output for each queue indicates a likelihood that selection of an I/O request from the queue will maintain desired response time ratios between the queues. The received output for each of the queues is used to select a queue of the queues. An I/O request from the selected queue is processed.

The first embodiment provides improved techniques to select a priority queue when multiple priority queues queue I/O requests to a storage to maintain desired response time ratios between the queues. Described embodiments use at least one machine learning module that receives as input I/O statistics on the processing of I/O requests at the queues and generates outputs indicating a likelihood that selection of each queue will maintain the desired response time ratios between the queues. In this way, instead of just selecting queues based on a predetermined selection routine, such as round robin, etc., selection of a particular queue is made by a machine learning algorithm that considers current I/O statistics on processing of the queues to produce outputs indicating a measurement or likelihood of how selection of each queue will maintain the desired response time ratios between the queues.

In a second embodiment, the first embodiment may additional include that the output for each of the queues comprises a value from zero to one indicating a likelihood that selection of a I/O request from the queue will maintain the desired response time ratios between the queues. Using the received output to select a queue comprises selecting one of the queues having a highest output value.

The second embodiment provides an improved selection technique for optimizing queue selection to maintain desired response time ratios between the queues by selecting the queue having a highest output value from zero to one indicating a likelihood that selection of that queue will maintain the desired response time ratios between the queues. These dynamic output values determined by current operating conditions provides a dynamic approach for selecting a queue of multiple priority queues that is not realized by static selection techniques.

In a third embodiment, the first embodiment may further have queues including a low priority queue, medium priority queue, and high priority queue. The medium priority queue stores higher priority I/O requests than the low priority queue. The high priority queue stores higher priority I/O requests than the medium priority queue. The desired response time ratios between the queues include a desired high priority ratio of a desired response time for the high priority queue to a desired response time for the medium priority queue and a desired medium priority ratio of a desired response time for the medium priority queue to a desired response time for the low priority queue.

With the third embodiment, there are three priority queues, low, medium and high, and the machine learning module produces output values to maintain a desired response time ration of a desired response time for a high priority queue to a desired response time for the medium priority queue and a desired medium priority ratio is of a desired response time for the medium priority queue to a desired response time for the low priority queue. By producing output values that lead to selection of the queue to process an I/O request that will more likely maintain the desired response time ratios, the queues are processed in a manner that maintains the desired processing goals for the queues based on current operating conditions.

A fourth embodiment provides a computer program product, system, and method for selecting one of a plurality queues having Input/Output (I/O) requests for a storage to process. At least one machine learning module receives as input I/O statistics for the queues based on I/O activity at the queues and produces output for each of the queues. The output for each queue indicates a likelihood that selection of an I/O request from the queue will maintain expected response time ratios between the queues. A determination is made of an adjusted output for at least one of the queues. The at least machine learning module is retrained with the input I/O statistics to produce the adjusted output for the at least one of the queues. The retrained machine learning module is used to select one of the queues from which to process an I/O request.

The fourth embodiment provides improved techniques to determine adjusted outputs for the machine learning module that are used to retrain the at least one machine learning module to improve the ability of the at least one machine learning module to produce outputs that indicate a correct likelihood that selection of a particular queue will result in the desired response time ratios between the queues. The retraining is performed when the measured response time ratios for the queues does not match the desired response to ratios. In such case, the output is adjusted based on the extent to which the measured response time ratios does not match the desired response time ratios, so that when the adjusted output is used to retrain the at least one machine learning module, the machine learning module will produce more accurate output values, or likelihoods that the selection of the queues will maintain the desired response time ratios. This is an improvement of static selection techniques that do not adjust based on a status of an extent to which the desired response time ratios are being maintained.

In a fifth embodiment, the fourth embodiment may optionally provide that the plurality of queues includes a low priority queue, a medium priority queue, and a high priority queue. The medium priority queue stores higher priority I/O requests than the low priority queue and the adjusted output of the high priority queue is determined using a desired high priority ratio of a desired response time for the high priority queue to a desired response time for the medium priority queue. The adjusted output of the medium priority queue is calculated using a desired medium priority ratio of a desired response time for the medium priority queue to a desired response time for the low priority queue.

With the fifth embodiment, the at least one machine learning module provides output value for low, medium and high priority queues indicating a likelihood that selection of the low, medium and high priority queues will maintain the desired response time ratios. The described embodiments further improve the selection process for low, medium, and high priority queues by taking into account a ratio of desired response times between the high and medium priority queues and a ratio of desired response times between the medium and low priority queues.

In a sixth embodiment, the fifth embodiment may further include determining whether any of the queues have an average response time greater than an acceptable maximum average response time and adjusting at least one of the adjusted outputs and recent outputs from the machine learning module used to retrain the machine learning module to increase an adjusted or recent output of as queue having an average response time greater than the acceptable maximum average response time relative to any queues having average response time less than the acceptable maximum average response time.

With the sixth embodiment, the output values are further adjusted if any of the average response times of the queues exceeds an acceptable maximum average response time to further increase the relative output values for those queues whose response time exceeds the acceptable maximum average response time because those queues need to be more frequently selected to reduce the extent to which their response times exceed the acceptable maximum average. The at least one machine learning module is then retrained to produce those higher output values that will allow for more frequent selection of those queues whose average response time exceeds the acceptable maximum average. In this way, the queue selection technique is additionally adjusted on an additional dimension of the acceptable maximum average to further optimize the output of the at least one machine learning module to produce output values that favor those queues having measured response times exceeding an acceptable maximum average, independent of the desired ratios.

DETAILED DESCRIPTION

A storage controller sends I/O requests for a storage, such as a RAID array of ranks, to a device adaptor that implements the RAID algorithms to stripe data across RAID strides configured in the RAID ranks configured in the storage. The device adaptor may maintain a high, medium and low priority queues in which to queue requests based on priority. Prior art techniques may use a round robin selection algorithm to select the priority queue and then process a fixed number of requests from each queue, where more requests are processed from a higher priority queue than a lower priority queue. Such systems that rigidly select queues and process a fixed number of requests do not take into account various factors that impact the servicing times for the priority queues and may not maintain desired response time ratios between the queues by over or underselecting requests from certain of the priority queues.

Described embodiments provide improvements to computer technology for selecting a priority queue from which to process an I/O request that takes into account current I/O statistics of I/O activity at the queues. A machine learning module may receive this input on the priority queue and rank information and generate output for each of the priority queues that indicates for each queue a likelihood that selection of an I/O request from the queue will maintain desired response time ratios between the queues. An I/O request may then be processed from the selected queue. In this way, described embodiments use a machine learning module that selects a queue to maintain the desired response time ratios between the priority queues that considers current I/O activity at the priority queues and the ranks.

Described embodiments provide further improvements to the computer technology for selecting a priority queue by determining an adjusted output for one or more of the queues that takes into account an extent to which the desired response time ratios for the priority queues are not being maintained. The adjusted output may then be used to retrain the machine learning module to receive the input I/O cache statistics on I/O activity measurements at the priority queues and RAID rank activity and produce the adjusted outputs for the queues. In this way, with the described embodiments, the machine learning module is constantly being retrained to produce output used to select priority queues to maintain the desired response time ratios between the queues.

Figure 1:
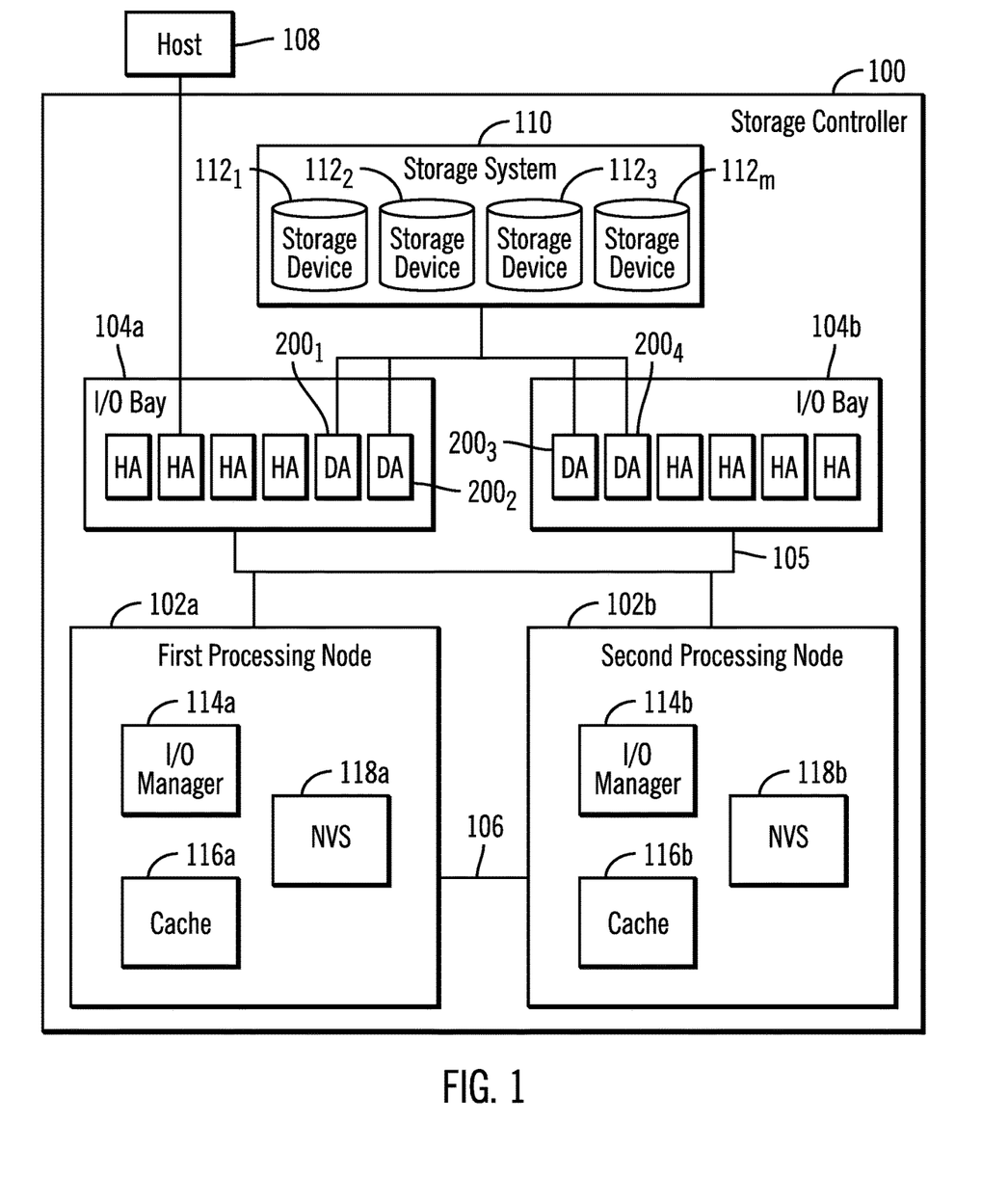
FIG. 1 illustrates an embodiment of a computing environment.

FIG. 1 illustrates an embodiment of a storage controller 100 including a plurality of independent processing nodes 102*a*, 102*b*, such as a central electronics complex (CEC), that each connect to Input/Output (I/O) bays 104a, 104b having device adaptors (DA) and hardware adaptors (HA) therein, over a bus interface 105, such as a Peripheral Component Interconnect Express (PCIe) bus. The processing nodes 102a, 102b may also communicate with each other directly over a link 106, such as a PCIe bus. Host systems, such as host 108, may connect to the storage controller 100 through a host adaptor (HA) in the I/O bays 104a, 104b.

A storage system 110 includes a plurality of storage devices $112_1 \ldots 112_m$, in which tracks, logical volumes, ranks of logical contiguous storage spaces, and storage arrays, such as Redundant Arrays of Independent Disks (RAID), may be configured. Each processing node 102a, 102b is assigned one of the device adaptors in each of the I/O bays 104a, 104b that connect to the storage array 110 to provide access to data configured in the storage devices 112. Each processing node 102a, 102b has a default configuration to communicate with a device adaptor (DA) $200_1$, $200_2$, $200_3$, $200_4$ in one of the I/O bays 104a, 104b, where the default configuration will assign the different processing nodes 102a, 102b to device adaptors in the I/O bays 104a, 104b.

Each processing node 102a, 102b includes an I/O manager 114a, 114b to manage I/O requests from attached hosts 108 to storage arrays configured in the storage devices $112_1 \ldots 112_m$, and perform other related operations, such as path selection and error handling. Each processing node 102a, 102b further includes a cache 116a, 116b to cache tracks from the storage devices $112_1 \ldots 112_m$ and a non-volatile storage ("NVS") 118a, 118b to provide a backup storage of modified tracks in the other cache 120b, 120a, respectively. Each processing node 102a, 102b may be assigned groups of the storage arrays configured in the storage devices $112_1 \ldots 112_m$.

In the embodiment of FIG. 1, two redundant processing nodes 102a, 102b and two I/O bays 104a, 104b are shown. In further embodiments, there may be more than the number of shown redundant elements 102a, 102b, 104a, 104b, to provide additional redundancy.

The storage controller 100 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

The storage devices $112_1 \ldots 112_m$ in the storage system 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices $112_1 \ldots 112_m$, such as Just a Bunch of Disks (JBOD), Direct Access Storage Device (DASD), Redundant Array of Independent Disks (RAID) array, virtualization device, etc. Further, the storage devices 112 in the system 110 may comprise heterogeneous storage devices from different vendors and different types of storage devices, such as a first type of storage devices, e.g., hard disk drives, that have a slower data transfer rate than a second type of storage devices, e.g., SSDs.

The caches 120a, 120b may comprise memory devices, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and a Non-Volatile Direct In-Line Memory Modules (DIMMs) with byte-addressable write-in-place memory, etc. The non-volatile storage ("NVS") 122a, 122b may comprise a non-volatile storage, such as NAND storage, e.g., flash memory, Solid State Drive (SSD) storage, non-volatile RAM, etc. Other non-volatile devices may be used for the non-volatile storage 122a, 122b, such as a battery backed-up DIMM.

The components, such as the I/O managers 114a, 114b, host adaptors (HA), and device adaptors (DA) $200_1$, $200_2$, $200_3$, $200_4$ may be implemented in computer readable program instructions in a computer readable storage medium executed by a processor and/or computer hardware, such as an Application Specific Integrated Circuit (ASIC).

Figure 2:
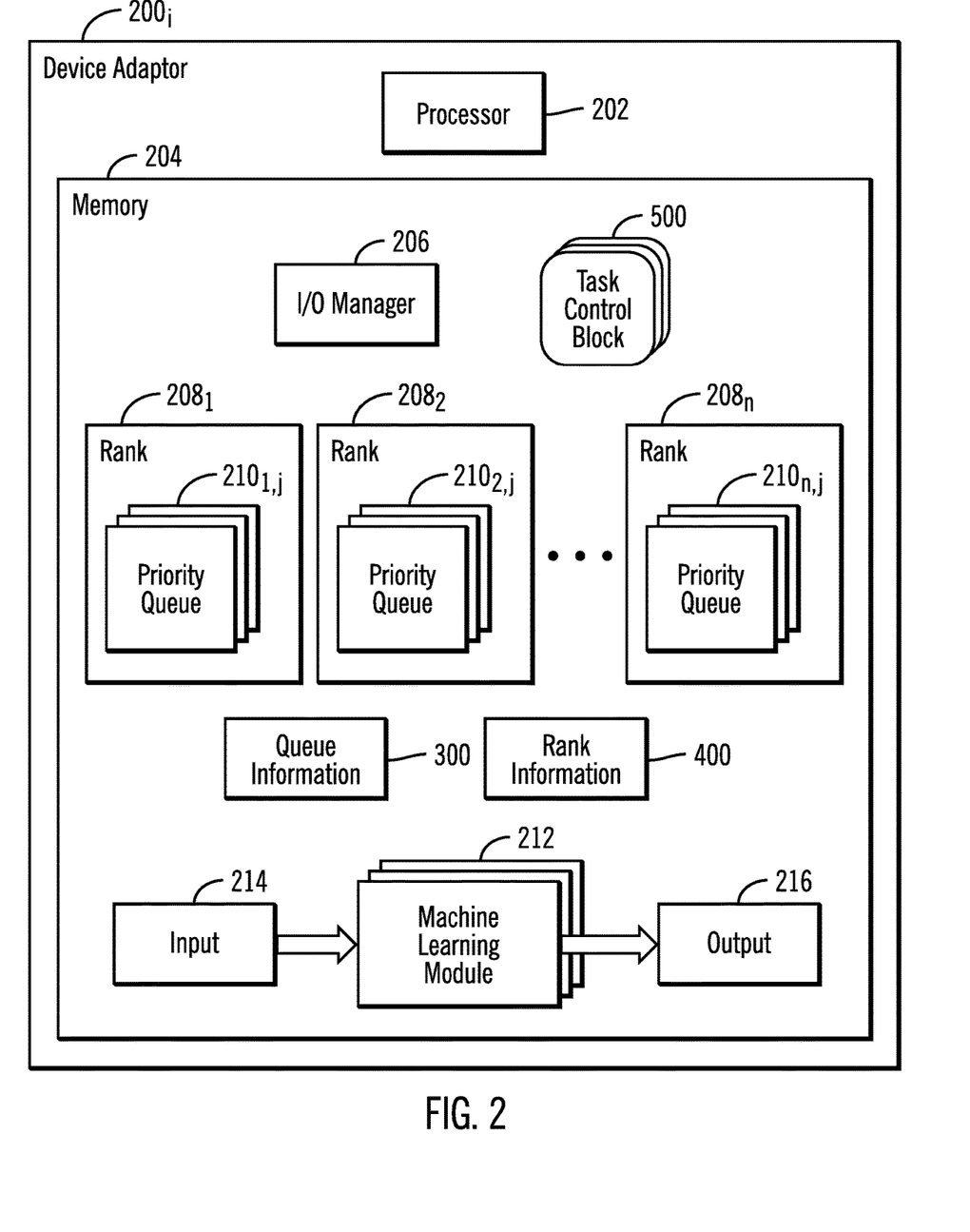
FIG. 2 illustrates an embodiment of a device adaptor.

FIG. 2 illustrates an embodiment of a device adaptor $200_i$, such as one of the device adaptors $200_1$, $200_2$, $200_3$, $200_4$, including a processor 202, such as one or more processor devices, and a memory 204 having program code executed by the processor 202. The memory 204 includes an I/O manager 206 executed by the processor 202 to manage the execution of I/O requests from one of the processor nodes 102a, 102b, with respect to storage devices 112, and for each of the n ranks configured in the storage devices 112, a set of priority queues $208_1, 208_2 \ldots 208_n$. Each priority queue $210_{i,j}$ in a set $208_i$, for rank i queues I/O requests classified as having a certain priority j, such as low, medium, high and any other additional priorities. In embodiments where the storage 110 is not configured into ranks or separate sections comprised of distinct storage devices $112_1 \ldots 112_m$, there may be only one set of priority queues $208_1$.

The I/O manager 206 maintains queue information 300 having I/O statistics related to I/O request activity at the queues for the RAID ranks and rank information 400 having usage information and statistics for the RAID ranks. The device adaptor 200, further maintains one or more machine learning modules 212 that receive as input 214 I/O statistics from the queue information 300 and rank information 400 for a rank and produce as output 216 output values for each of the priority queues for a rank. The output values 216 for the priority queues indicate a likelihood selection of a queue will result in maintaining desired response time ratios between the queues. For instance, when there are low, medium and high priority queues for a rank, a desired high priority ratio may provide a ratio of a desired response time for the medium priority queue to a desired response time for the high priority queue, e.g., the response time of the medium priority queue is 3 times longer than for high priority queue. A desired medium priority ratio may comprise a ratio of a desired response time for the low priority queue to a desired response time for the medium priority queue, e.g., the response time of the low priority queue is 3 times longer than for the medium priority queue. In this way, the machine learning module 212 provides an output value for each of the queues indicating the likelihood selection of a particular queue to process an I/O request will result in maintaining the desired ratios. The queue having the highest output value is the queue whose selection will have the greatest likelihood of maintaining the desires response time ratios between the queues.

The memory 204 may include one distinct machine learning module 212 for each RAID rank configured in the storage 110 or one machine learning module for all the ranks. The machine learning modules 212 implement a machine learning technique such as decision tree learning, association rule learning, artificial neural network, inductive programming logic, support vector machines, Bayesian models, etc., to determine a confidence level indicating a likelihood that selection of a queue $210_{i,j}$ would maintain the desired response time ratios between the queues. The I/O manager 206 may then use the outputted values for the queues to select the queue, from which to process an I/O request, having the highest output value, or highest likelihood of resulting in maintaining the desired queue ratios.

In one embodiment, the machine learning modules 212 may comprise artificial neural network programs. Each neural network may be trained using backward propagation to adjust weights and biases at nodes in a hidden layer to produce adjusted output values for the queues for the rank with which the machine learning module 212 is associated. The outputs are adjusted and the machine learning module 212 adjusted to produce these outputs to obtain results to improve the queue selection to maintain the desired ratios of the queue response times. In back propagation, the margin of error of the output is measured and the weights and biases at nodes in the hidden layer are adjusted accordingly to decrease the error. Back propagation may comprise an algorithm for supervised learning of artificial neural networks using gradient descent. Given an artificial neural network and an error function, the method may calculate the gradient of the error function with respect to the neural network's weights and biases.

Figure 5:
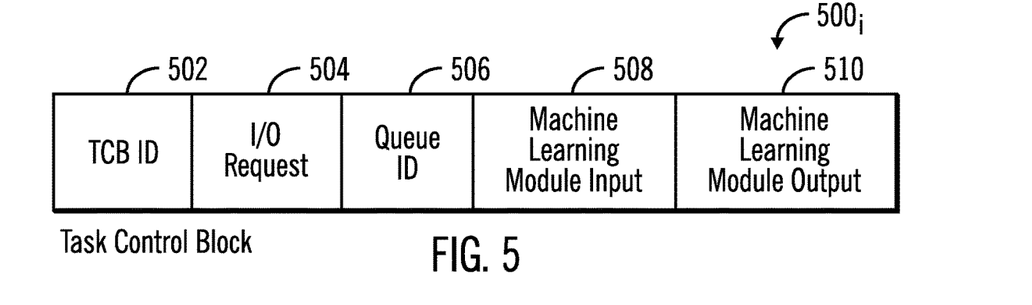
FIG. 5 illustrates an embodiment of a task control block (TCB) generated to process an I/O request from one of the priority queues.

The I/O manager 206 may generate a task control block 500 to manage the use of the machine learning modules 212 to generate the output values 216 for a rank to use to select a queue to process and to adjust the output values to retrain the machine learning module 212 to improve the predictive capability in selecting a queue that will maintain the desired response time ratios for the queues.

The I/O manager 206 and machine learning modules 212 are shown in FIG. 2 as program code loaded into the memory 204 and executed by the processor 106. Alternatively, some or all of the functions may be implemented in hardware devices in the device adaptors 200, such as in Application Specific Integrated Circuits (ASICs) or executed by separate dedicated processors.

The storage 110 may comprise one or more storage devices $112_1 \ldots 112_m$ known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 204 may comprise a suitable volatile or non-volatile memory devices, including those described above.

Figure 3:
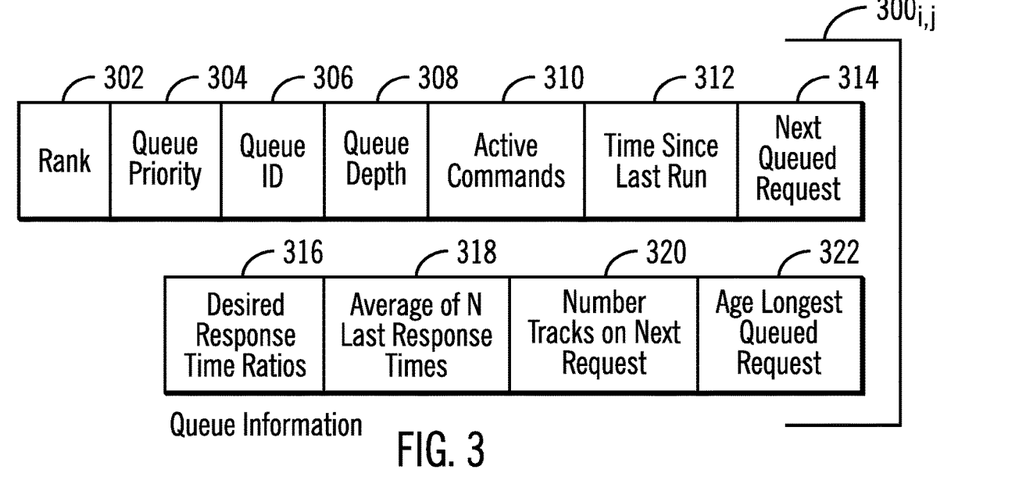
FIG. 3 illustrates an embodiment of queue information maintaining I/O statistics on access to a priority queue.

FIG. 3 illustrates an embodiment of queue information $300_{i,j}$ in the queue information 300 the I/O manager 206 maintains for a RAID rank i and priority queue j, including: a RANK identifier or number 302; a queue priority 304 of the queue $210_{i,j}$ for which the information is maintained (where a higher priority increases the output value and lower priority decreases the output value); a queue identifier 306 or pointer; a queue depth 308 indicating a number of I/O requests queued in the queue $210_{i,j}$ (where a higher queue depth increases the output value for that queue and relatively lower queue depth decreases the output value); number of active commands 310 in the queue $210_{i,j}$ (a higher number of active commands tends to increase the output value for a queue relative to a lower number of active commands); a time since a last run 312 or last time the queue $210_{i,j}$ was accessed (where a longer time tends to increase the output value for the queue relative to a lower elapsed time); a next queued request 314 in the queue to process; desired response time ratios 316, such as a ratio of the desired response time for queue $210_{i,j}$ to the desired response time for another priority queue such as $210_{i,j\pm1}$, which desired response time ratios may be preset to remain unchanged during operations; average of N last response times 318 to complete processing queued I/O requests from the queue $210_{i,j}$; number of tracks in the next queued request 320; and an age of the longest queued request 322 queued in the queue $210_{i,j}$ (where a longer age tends to increase the output value relative to shorter age to avoid starvation of requests in a queue).

The I/O manager 206 may update the queue information $300_{i,j}$ after completing processing each request from the queue $210_{i,j}$ or update after processing a fixed number of I/O requests. Additional, different or further information may be maintained in the queue information $300_{i,j}$.

Figure 4:
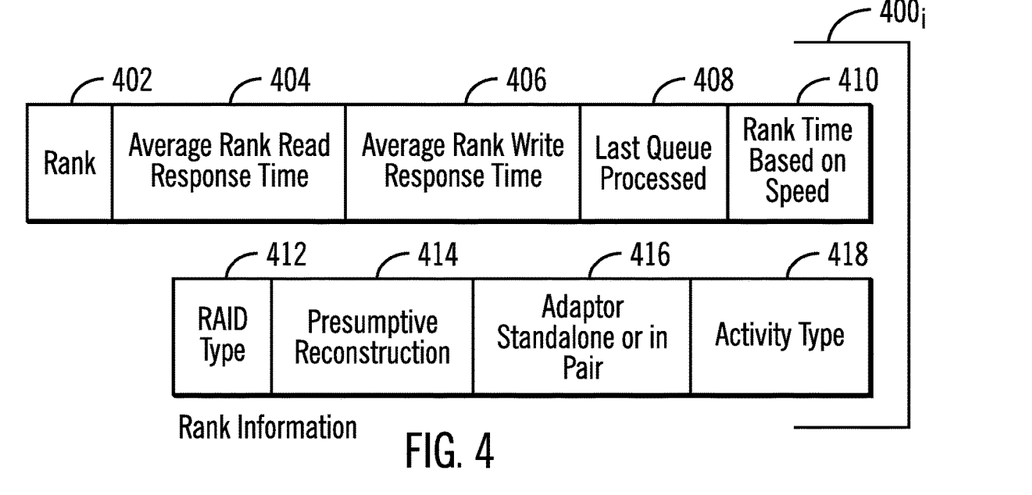
FIG. 4 illustrates an embodiment of rank information having information on I/O activity at a rank configured in the storage.

FIG. 4 illustrates an embodiment of rank information 400, the I/O manager 206 maintains for each RAID rank i configured in the storage 110, including: a rank identifier 402; and average rank read response time 404; and average rank write response time 406; a last queue processed 408; a rank time based on speed 410; r RAID type 412, such as a RAID level, e.g., 1, 2, 3, 4, 5, etc.; a presumptive reconstruction flag 414 indicating whether the RAID rank 402 is being rebuilt; adaptor standalone or in pair field 416 indicating whether the device adaptor 200, storing the rank information 400, is operating as an only adaptor in the storage controller 100 or operating with a pair of device adaptors in an I/O bay 104a, 104b; and an activity type 418 of the type of write activity or operation mode at the rank i.

Each of the instances of information in the queue information $300_{i,j}$ for each queue j in a raid rank i and the rank information $400_i$ for the rank i may be used as input 214 to the machine learning module 212. In neural network implementations, weights and biases in a hidden layer of nodes would be assigned to these inputs to indicate their predictive quality in relation to other of the inputs based on training to reach desired output values for the queues for which the machine learning module 212 is producing outputs.

FIG. 5 illustrates an instance of a task control block (TCB) $500_i$ generated to process an I/O request in a set of queues $208_i$ for RAID rank i, and includes a task control block identifier 502; the I/O request 504 being processed by the TCB 502; a queue ID 506 of the queue $210_{i,j}$ selected to process; the machine learning module input 508 provided as input 214 from the queue information $300_{i,j}$ of all queues j for a rank i and rank information $400_i$; and the machine learning module output 510 comprising the output values 216 for the priority queues in the rank i. In this way, the task control block $500_i$ maintains information to process the I/O request 504 and the output 510 to use to select one of the priority queues and retrain the machine learning module 212 based on the used input 508 and adjustments to the recent output 510.

Figure 6:
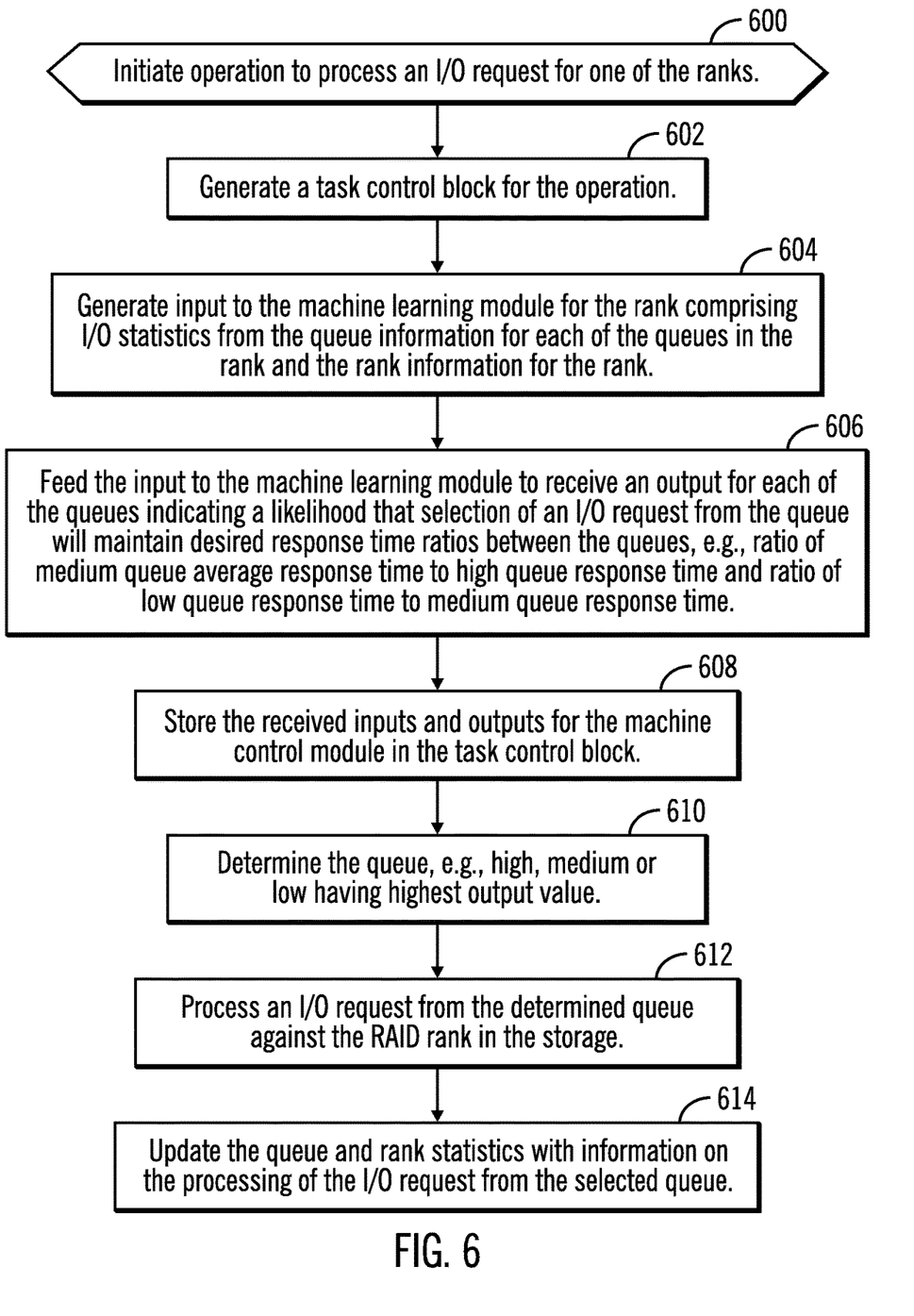
FIG. 6 illustrates an embodiment of operations to select a priority queue from which to select an I/O request to process.

FIG. 6 illustrates an embodiment of operations performed by the I/O manager 206 in a device adaptor to process an I/O request for one of the ranks configured in the storage 110. Upon initiating (at block 600) operations to select a queue $210_{i,j}$ for rank i to process, a task control block $500_i$ is generated (at block 602) to process an I/O request and retrain the queue. The I/O manager 206 generates (at block 604) input 214 to the machine learning module 212 for the rank i comprising I/O statistics from the queue information $300_{i,j}$ for each of the queues j in the rank i and the rank information $400_i$ for the rank i, which is stored as input 508 in the task control block $500_i$. The I/O manager 206 feeds (at block 606) these inputs 214 into the machine learning module 212 to receive an output for each of the queues $210_{i,j}$ for rank i indicating a likelihood that selection of an I/O request from the queue $210_{i,j}$ will maintain desired response time ratios between the queues, e.g., ratio of medium queue average response time to high queue response time and ratio of low queue response time to medium queue response time. The received inputs 214 and outputs 216 are stored in the task control block $500_i$ in fields 508 and 510, respectively.

The I/O manager 206 determines (at block 610) the queue $210_{i,j}$, e.g., high, medium, and low, having the highest output value. The determined queue $210_{i,j}$ may be stored in field 506 of the task control block $500_i$. An I/O request is processed (at block 612) from the determined queue $210_{i,j}$ to perform against the RAID rank i in the storage 110. The queue information $300_{i,j}$ and rank information $400i$ statistics for rank i and all queues $210_{i,j}$ are updated (at block 614) with information on the processing of the I/O request from the selected queue $210_{i,j}$. In certain embodiments, if all the output values are zero, the I/O request is not processed.

With the described embodiments, a machine learning module 212 implementing a machine learning module is used to select a queue for a rank from which to process an I/O request that seeks to maintain the desired response time ratios between the different queues while I/O requests are being processed. This provides improvements over automatic selection routines, such as round robin or other techniques that select a fixed number from each priority queue, because the described embodiments take into account current queue information for the queues in a rank and rank information, such as queue depth of the queues being considered, active commands in the queues, time since last run, average of N last response times, number tracks on next request, age of the longest queued request 322, and rank information $400_i$ all factors that have a predictive weight in selecting a queue $200_{i,j}$ to maintain the desired response time ratios between the queues.

Figure 7:
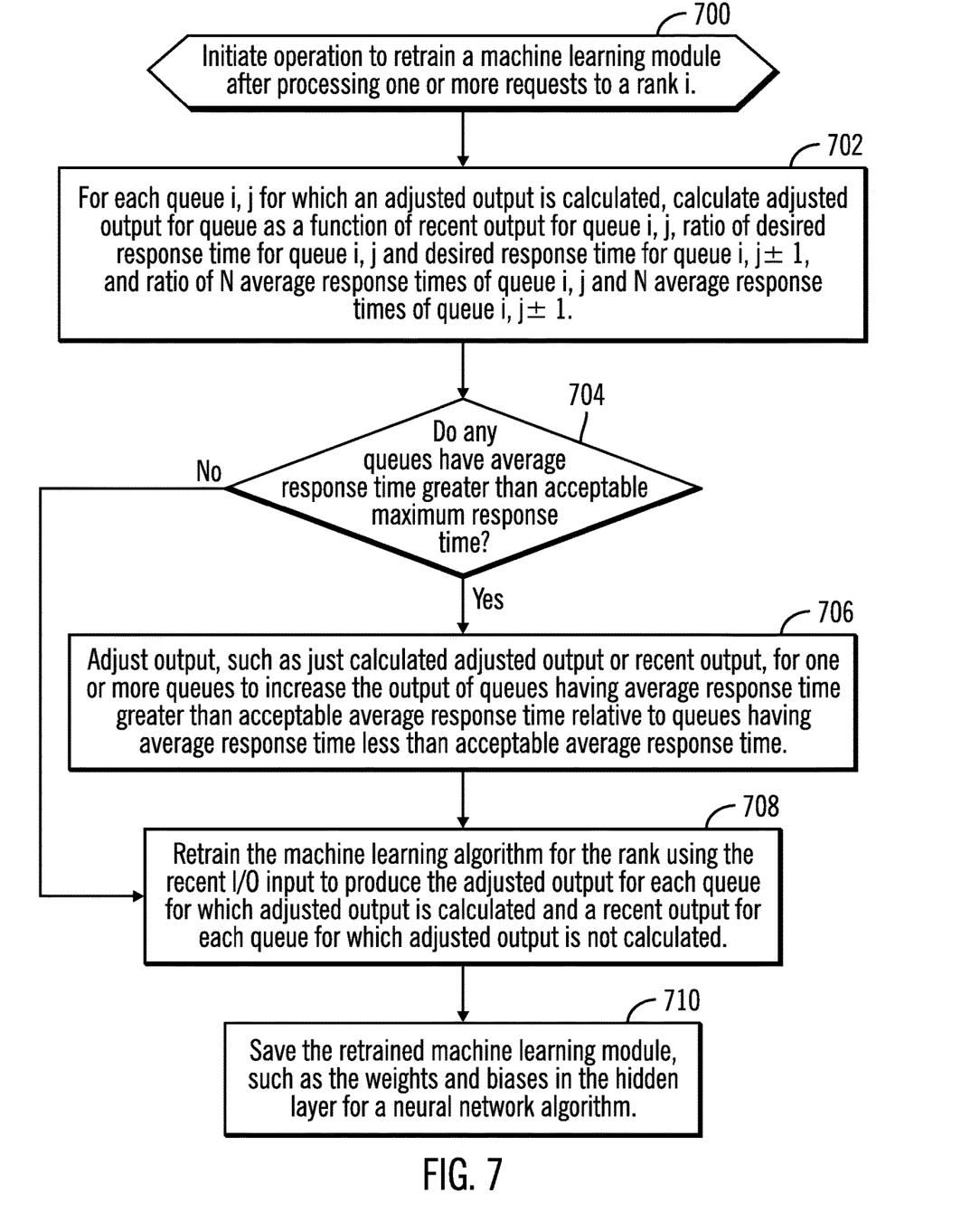
FIG. 7 illustrates an embodiment of operations to retrain a machine learning module to provide output values used to select one of the priority queues from which to process an I/O request.

FIG. 7 illustrates an embodiment of operations performed by the I/O manager 206 to retrain the machine learning module 212 just used to select a queue, and use the inputs 508 and outputs 510 previously used and produced by the machine learning module 212 to retrain. The machine learning module 212 is retrained to use output values adjusted to select queues so as to maintain the desired response time ratios 316 for the queues. Upon initiating (at block 700) to retrain a machine learning module 212 indicated in a task control block $500_i$ such as in field 506, the machine learning module 212 calculates (at block 702), for each queue $210_{i,j}$ for which an adjusted output is calculated, adjusted output for a queue as a function of recent output for queue $210_{i,j}$, a ratio of desired response time for queue $210_{i,j}$ and desired response time for another queue $210_{i,j\pm1}$, and ratio of N average response times 318 of queue $210_{i,j}$ and N average response times 318 of queue $210_{i,j\pm1}$.

For instance, the output may be adjusted for a high priority queue and a medium priority queue, but not the low priority queue. In such case, the desired high priority ratio would comprise a ratio of a desired response time for the medium priority queue to a desired response time for the high priority queue and a desired medium priority ratio of a desired response time for the low priority queue to a desired response time for the medium priority queue. In an alternative implementation, the output for the medium and low priority queues may be adjusted, and not the high priority queue. The output used to retrain the machine learning module 212 for the priority queues not adjusted may comprise the output indicated in field 510 produced in FIG. 6 to select the queue to process.

In one embodiment, the calculating the adjusted output for the high priority queue may comprise:
  a recent output for the high priority queue plus (a constant X times (the desired high priority ratio minus (a measured ratio of an average of measured response times for the medium priority queue and an average of measured response times for the high priority queue)).

The recent output may comprise the output 510 indicated in the task control block $500_i$ and the constant X can be less or greater than one and determines how fast (chaotic) or slow the neural network modules 212 adapt. The desired high priority ratio may comprise a ratio of a desired response time for the medium priority queue to a desired response time for the high priority queue, which may be indicated in field 316 of the queue information $210_{i,j}$ for the high priority queue. The measured response times for the high and medium priority queues may be from the field 318 in the queue information $300_{i,j}$ for the medium and high priority queues.

In one embodiment, the calculating the adjusted output for the medium priority queue may comprise:
  a recent output for the medium priority queue plus (a constant X times (the desired medium priority ratio minus (a measured ratio of an average of measured response times for the low priority queue and an average of measured response times for the medium priority queue)).

The recent output may comprise the output 510 indicated in the task control block $500_i$ and the constant X can be less or greater than one and determines how fast (chaotic) or slow the neural network modules 212 adapt. The desired medium priority ratio may comprise a desired response time for the low priority queue to a desired response time for the medium priority queue, which may be indicated in field 316 of the queue information $210_{i,j}$ for the medium priority queue. The measured response times for the medium and low priority queues may be from the field 318 in the queue information $300_{i,j}$ for the medium and low priority queues.

With the above embodiments, if the ratio is from the lower priority queue to the higher priority queue, then the adjustment value is positive if the higher priority queue response time increases relative to the lower priority queue, which positive value increases the output value to increase the likelihood of selecting the higher priority queue and lower the response time of the higher priority queue. The adjustment value is negative if the lower priority queue response time increases relative to the higher priority queue to cause a reduction in the output value for the higher priority queue to reduce the likelihood of selecting the higher priority queue to improve the response time of the lower priority queue.

If (at block 704) any of the queues $210_{i,j}$ have an average response time 318 greater than an acceptable maximum response, time then the outputs for one or more of the queues, in field 510 of the task control block 500$_i$ are adjusted (at block 706) to increase the outputs for queues having an average response time greater 318 than the acceptable average response time relative to queues having average response time less than acceptable average response time. For instance, in one embodiment, the I/O manager 206 or machine learning module 212 may increase the output values for the one or more queues having an average response time 318 greater than the maximum acceptable average response time or decrease the output values for the one or more queues having an average response time 318 less than the maximum acceptable average response time.

With the adjustments at blocks 702 and 706, the calculated outputs from field 510 are adjusted based on an extent to which the desired ratio of the response times exceeds or is less than a ratio of the measured response times of the queues in the ratio. For instance, if the desired ratio of the response times of the lower priority queue to the higher priority queue is greater than a ratio of the measured response times for the lower priority queue to the higher priority queue, then the response time for the higher priority queue needs to be improved by increasing the output value. Further, the output value is adjusted for queues whose response time exceeds a maximum response time.

After adjusting the output values for the queues at block 702 and/or 706, the machine learning module 212 (or I/O manager 206) retrains (at block 708) the weights and biases of the machine learning module 212 for the rank using the recent I/O input 214 to produce the adjusted output for each queue for which adjusted output is calculated and a recent output for each queue for which adjusted output is not calculated. In one embodiment, only certain of the queues may be adjusted, such as the high and medium priority queues, but the low priority queue is not adjusted. Alternatively, all the priority queues may have their output adjusted for retraining the machine learning module 212. After retraining the machine learning module, such as the weights and biases for an artificial neural network algorithm, in the machine learning module 212, the trained machine learning module 212 is saved (at block 710), such as saving the retrained weights and biases in the hidden layer of a neural network machine learning algorithm.

In the above embodiments, there is one acceptable maximum response time discussed. However, in further embodiments, there may be a different acceptable maximum response time for each priority queue, such that there are different maximum acceptable response times for different priority queues.

With the embodiments of FIG. 7, the last calculated outputs for the priority queues may be adjusted if the measured or actual response time ratios for the queues differ from desired response time ratios for the queues. In such case, the outputs are increased for queues that need to have their processing increased to adjust the ratio towards the desired levels. Further, the output values may be adjusted if one of the queues average response times has exceeded an acceptable level. In this way, if the output values of queues are adjusted upward, the machine learning module 212 is retrained to produce higher output values for those queues whose response times are lower than desired with respect to other queues and need to be reduced. Likewise, if the output values of queues are adjusted downward, the machine learning module 212 is retrained to produce lower output values for those queues whose response times are higher than desired with respect to other queues and need to be reduced.

In this way, described embodiments provide a dynamic technique for selecting a queue among a plurality of priority queues from which to process an I/O request, and the dynamic technique or machine learning module may be retrained to change the output values based on the response times for the queues to try to approximate as close as possible desired response time ratios for the queues.

In the described embodiment, variables i, j, m, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
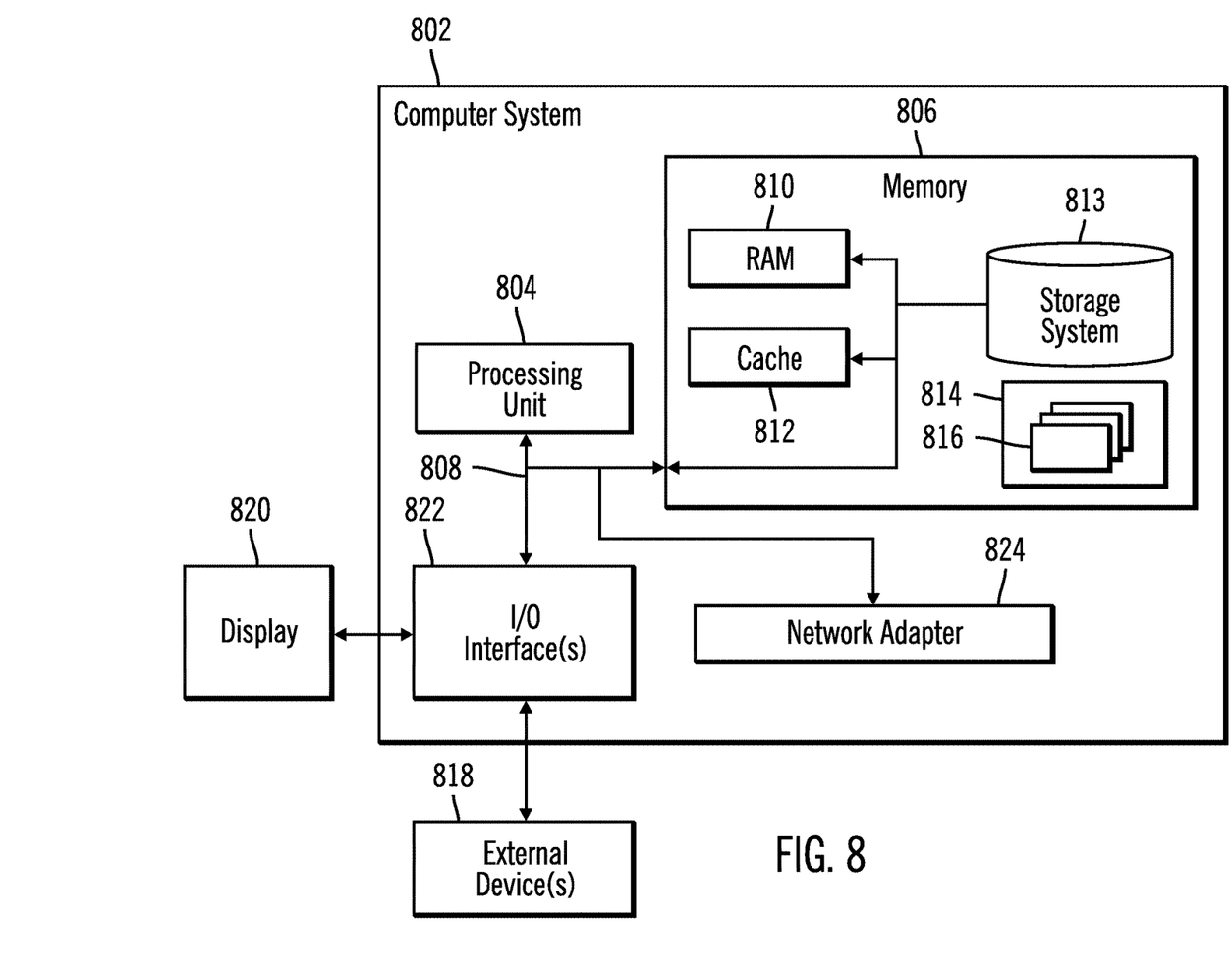
FIG. 8 illustrates a computing environment in which the components of FIG. 1 may be implemented.

The computational components of FIG. 1, including the storage controller 100, host 108, processing nodes 102a, 102b and device adaptors 200$_i$ may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for selecting one of a plurality of queues having Input/Output (I/O) requests for a storage to process, comprising a computer readable storage medium having computer readable program code embodied therein that when executed performs operations, the operations comprising:

providing Input/Output (I/O) statistics on processing of I/O requests at the queues to at least one machine learning module, including at least two I/O statistics that are a member of a set of I/O statistics comprising: a queue depth of a number of I/O requests queued in the queue; number of active commands in the queue; last time the queue was accessed; response times to complete processing queued I/O requests from the queue; amount of data in queued requests; and age of longest queued request in the queue;

receiving, from the at least one machine learning module, output values for the queues, wherein an output value for each queue comprises a measurement that indicates a likelihood that selection of an I/O request from the queue will maintain desired response time ratios between the queues, wherein a queue having a highest output value of the queues is a queue having a greatest likelihood of maintaining the desired response time ratios between the queues;

selecting a queue of the plurality of queues having the highest output value; and processing an I/O request from the selected queue.

2. The computer program product of claim 1, wherein the output value measurement for each queue of the queues comprises a value from zero to one indicating a likelihood that selection of an I/O request from the queue will maintain the desired response time ratios between the queues, wherein using the received output values to select a queue comprises selecting one of the queues having a highest output value.

3. The computer program product of claim 1, wherein the plurality of queues includes a low priority queue, medium priority queue, and high priority queue, wherein the medium priority queue stores higher priority I/O requests than the low priority queue, wherein the high priority queue stores higher priority I/O requests than the medium priority queue, and wherein the desired response time ratios between the queues include a desired high priority ratio of a desired response time for the high priority queue to a desired response time for the medium priority queue and a desired medium priority ratio of a desired response time for the medium priority queue to a desired response time for the low priority queue.

4. The computer program product of claim 3, wherein the input I/O statistics further include:
- an average response time for reads in each of the queues;
- an average response time for writes in each of the queues;
- an average number of tracks per request for each of the queues;
- a last queue of the queues that was processed;
- indication of whether a next request for each of the queues comprises a read or a write; and
- a number of tracks on a next request for each of the queues.

5. The computer program product of claim 1, wherein the storage is configured as a Redundant Array of Independent Disk (RAID) ranks, wherein each of the RAID ranks is comprised of storage devices, and wherein there are a set of queues for each of the RAID ranks queueing requests for the RAID rank, wherein the queues in each set of queues include requests of different priorities, wherein the input I/O statistics include, for each of the RAID ranks, at least one of:
- a number of active commands on the RAID rank for each of the queues in the set of queues for the RAID rank;
- an average response time for writes to the RAID rank in each of the queues queueing tracks for the RAID rank;
- an average response time for reads to the RAID rank in each of the queues queueing tracks for the RAID rank;
- rank type based on a speed of type of storage device storing tracks for the RAID rank;
- RAID level; and
- indication of whether raid RANK is undergoing preemptive reconstruction.

6. The computer program product of claim 5, wherein a plurality of device adaptors manage access to the RAID ranks, wherein each device adaptor of the device adaptors includes a set of queues for each of the RAID ranks to which the device adaptor connects, wherein each device adaptor of the device adaptors includes at least one machine learning module to select a queue from a set of the queues for the RAIDS ranks, wherein the input I/O statistics include:
- indication of whether each of the device adaptors is operating standalone or part of pair of device adaptors managing access to RAID ranks.

7. A system for selecting one of a plurality of queues having Input/Output (I/O) requests for a storage to process, comprising:
- a processor; and
- a computer readable storage medium having computer readable program code embodied therein that when executed performs operations, the operations comprising:
    - providing input/output (I/O) statistics on processing of I/O requests at the queues to at least one machine learning module, including at least two I/O statistics that are a member of a set of I/O statistics comprising: a queue depth of a number of I/O requests queued in the queue; number of active commands in the queue; last time the queue was accessed; response times to complete processing queued I/O requests from the queue; amount of data in queued requests; and age of longest queued request in the queue;
    - receiving, from the at least one machine learning module, output values for the queues, wherein an output value for each queue comprises a measurement that indicates a likelihood that selection of an I/O request from the queue will maintain desired response time ratios between the queues, wherein a queue having a highest output value of the queues is a queue having a greatest likelihood of maintaining the desired response time ratios between the queues;
    - selecting a queue of the plurality of queues having the highest output value; and
    - processing an I/O request from the selected queue.

8. The system of claim 7, wherein the output value measurement for each queue of the queues comprises a value from zero to one indicating a likelihood that selection of an I/O request from the queue will maintain the desired response time ratios between the queues, wherein using the received output values to select a queue comprises selecting one of the queues having a highest output value.

9. The system of claim 7, wherein the plurality of queues includes a low priority queue, medium priority queue, and high priority queue, wherein the medium priority queue stores higher priority I/O requests than the low priority queue, wherein the high priority queue stores higher priority I/O requests than the medium priority queue, and wherein the desired response time ratios between the queues include a desired high priority ratio of a desired response time for the high priority queue to a desired response time for the medium priority queue and a desired medium priority ratio of a desired response time for the medium priority queue to a desired response time for the low priority queue.

10. A method for selecting one of a plurality of queues having Input/Output (I/O) requests for a storage to process, comprising:
- providing input/output (I/O) statistics on processing of I/O requests at the queues to at least one machine learning module, including at least two I/O statistics that are a member of a set of I/O statistics comprising: a queue depth of a number of I/O requests queued in the queue;
- number of active commands in the queue; last time the queue was accessed; response times to complete processing queued I/O requests from the queue; amount of data in queued requests; and age of longest queued request in the queue;
- receiving, from the at least one machine learning module, output values for the queues, wherein an output value for each queue comprises a measurement that indicates a likelihood that selection of an I/O request from the queue will maintain desired response time ratios between the queues, wherein a queue having a highest output value of the queues is a queue having a greatest likelihood of maintaining the desired response time ratios between the queues;
- selecting a queue of the plurality of queues having the highest output value; and
- processing an I/O request from the selected queue.

11. The method of claim 10, wherein the output value measurement for each queue of the queues comprises a value from zero to one indicating a likelihood that selection of an I/O request from the queue will maintain the desired response time ratios between the queues, wherein using the received output values to select a queue comprises selecting one of the queues having a highest output value.

12. The method of claim 10, wherein the plurality of queues includes a low priority queue, medium priority queue, and high priority queue, wherein the medium priority queue stores higher priority I/O requests than the low priority queue, wherein the high priority queue stores higher priority I/O requests than the medium priority queue, and wherein the desired response time ratios between the queues include a desired high priority ratio of a desired response time for the high priority queue to a desired response time for the medium priority queue and a desired medium priority ratio of a desired response time for the medium priority queue to a desired response time for the low priority queue.

13. The system of claim 9, wherein the input I/O statistics further include:
- an average response time for reads in each of the queues;
- an average response time for writes in each of the queues;
- an average number of tracks per request for each of the queues;
- a last queue of the queues that was processed;
- indication of whether a next request for each of the queues comprises a read or a write; and
- a number of tracks on a next request for each of the queues.

14. The system of claim 7, wherein the storage is configured as a Redundant Array of Independent Disk (RAID) ranks, wherein each of the RAID ranks is comprised of storage devices, and wherein there are a set of queues for each of the RAID ranks queueing requests for the RAID rank, wherein the queues in each set of queues include requests of different priorities, wherein the input I/O statistics include, for each of the RAID ranks, at least one of:
- a number of active commands on the RAID rank for each of the queues in the set of queues for the RAID rank;
- an average response time for writes to the RAID rank in each of the queues queueing tracks for the RAID rank;
- an average response time for reads to the RAID rank in each of the queues queueing tracks for the RAID rank;
- rank type based on a speed of type of storage device storing tracks for the RAID rank;
- RAID level; and
- indication of whether raid RANK is undergoing preemptive reconstruction.

15. The system of claim 14, wherein a plurality of device adaptors manage access to the RAID ranks, wherein each device adaptor of the device adaptors includes a set of queues for each of the RAID ranks to which the device adaptor connects, wherein each device adaptor of the device adaptors includes at least one machine learning module to select a queue from a set of the queues for the RAIDS ranks, wherein the input I/O statistics include:
- indication of whether each of the device adaptors is operating standalone or part of pair of device adaptors managing access to RAID ranks.

16. The method of claim 12, wherein the input I/O statistics further include:
- an average response time for reads in each of the queues;
- an average response time for writes in each of the queues;
- an average number of tracks per request for each of the queues;
- a last queue of the queues that was processed;
- indication of whether a next request for each of the queues comprises a read or a write; and
- a number of tracks on a next request for each of the queues.

17. The method of claim 10, wherein the storage is configured as a Redundant Array of Independent Disk (RAID) ranks, wherein each of the RAID ranks is comprised of storage devices, and wherein there are a set of queues for each of the RAID ranks queueing requests for the RAID rank, wherein the queues in each set of queues include requests of different priorities, wherein the input I/O statistics include, for each of the RAID ranks, at least one of:
- a number of active commands on the RAID rank for each of the queues in the set of queues for the RAID rank;
- an average response time for writes to the RAID rank in each of the queues queueing tracks for the RAID rank;
- an average response time for reads to the RAID rank in each of the queues queueing tracks for the RAID rank;
- rank type based on a speed of type of storage device storing tracks for the RAID rank;
- RAID level; and
- indication of whether raid RANK is undergoing preemptive reconstruction.

18. The method of claim 17, wherein a plurality of device adaptors manage access to the RAID ranks, wherein each device adaptor of the device adaptors includes a set of queues for each of the RAID ranks to which the device adaptor connects, wherein each device adaptor of the device adaptors includes at least one machine learning module to select a queue from a set of the queues for the RAIDS ranks, wherein the input I/O statistics include:
- indication of whether each of the device adaptors is operating standalone or part of pair of device adaptors managing access to RAID ranks.

* * * * *